United States Patent Office 2,867,278
Patented Jan. 6, 1959

2,867,278
SEALING POROUS FORMATIONS

Harvey E. Mallory, Midland, Tex., and William H. Ayscue, Wilmington, Del., assignors to Great Western Drilling Company, Midland, Tex., a corporation of Texas No Drawing. Application November 16, 1956
Serial No. 622,547

9 Claims. (Cl. 166—33)

This invention relates to a novel method for sealing porous or permeable underground formations, particularly in connection with the drilling of wells. This application is a continuation in part of our copending application No. 606,990, filed August 30, 1956.

In subsurface mining and drilling operations, particularly in the drilling of oil or gas wells and the like, it frequently becomes necessary or desirable to seal off certain porous sections of the underground formation. For example, when drilling an oil well it is not uncommon to encounter a porous water-bearing underground structure which permits seepage or flow of water into the borehole. This inflow of water results in undesirable dilution of the drilling mud and otherwise interferes with the drilling operation. On the other hand, it is also quite common to encounter a highly porous underground formation which, instead of permitting underground water to flow into the borehole, allows drilling fluid to flow outwardly from the borehole and be lost in the formation. This condition, known as "lost circulation" in the rotary drilling art, is often very difficult to overcome and the driller often must go to great lengths in order to prevent the loss of drilling fluid into the formation.

As a further example of the importance of sealing a porous underground formation, mention should also be made of the more recent technique of drilling a well using air or gas as the drilling fluid for the removal of cuttings. While air or gas drilling has a number of important advantages, the possibility of water seepage into the borehole is an ever present threat and a serious limitation on the use of this technique. As will readily be understood, when water seeps into the borehole from a porous section of the formation, the chip particles tend to "ball up" or agglomerate into larger lumps which can no longer be carried from the well or entrained in the effluent air or gas stream. Generally speaking, if water seepage into the borehole is more than about two barrels per day, air or gas drilling becomes impractical and the driller must then revert to the use of a conventional drilling mud or fluid.

In addition to the foregoing situations which are encountered during a well drilling operation and which make it necessary to seal off the porous formation in some manner, there are also other circumstances in which it would be very desirable to have a convenient and effective technique for sealing off in a selective manner any desired porous underground section. As an example, strata of high permeability are responsible for an initial large production when an oil well is first completed. When it later becomes necessary to apply water or gas drive in order to restore or improve production, the high permeability strata are quickly flushed out and thereafter become a liability by short-circuiting the flow system. In such instances the greater part of the energy used in pumping repressurizing fluid may be wasted. At the same time, tight strata delivering oil to the producing well receive but a small portion of the pumped fluid. The net result is that recovery operations become uneconomical (because of excessive pumping required) long before all of the layers which make up the reservoir have been subjected to the sweeping action of the driving fluid. Obviously, if at this point the driller had available a convenient means for sealing off the more porous strata from the injection well, the flow of driving fluid under pressure into the oil bearing strata would then be insured.

Occasions may also arise in connection with a producing well when it would be very desirable to be able to prevent inflow of water into the well without interfering with the flow of oil from the formation into the well. The fact is that in some fields it is common knowledge that wells are often abandoned because of excessive water production rather than because of reduced oil producing capacity. The appearance of water from a producing stratum causes several troubles. Because water carries much less gas in solution and is heavier than oil, flowing wells decline in production and later must be pumped. With limited pump capacity, the necessity of lifting excessive water frequently makes it impossible to pump as much oil as the well will produce. Moreover, corrosion and emulsion problems frequently occur. In the case of such wells, it would be unnecessary to abandon the well for uneconomic operation if it were possible to inject into the well some sealing material which would plug the water producing strata but which would not interfere with the flow of oil from the oil producing strata. In this way, the relative proportion of oil in the fluid output from the well would be greatly increased. Also, in the drilling of wells, it is often necessary to seal off unwanted gas-bearing strata which interferes with normal drilling operations.

Accordingly, a broad object of the invention is to provide a novel and effective method for sealing a porous underground formation to prevent the passage of fluid therethrough.

A further object of the invention is to provide a novel means for preventing water seepage or inflow during an underground drilling or mining operation.

Another object of the invention is to provide a novel means for preventing interference with air or gas drilling operations by the seepage of water into the hole being drilled.

Still another object of the invention is to provide novel means for preventing loss of drilling fluid to a porous formation.

An additional object of the invention is to provide novel means for selectively sealing off a portion of an underground formation to facilitate production from an oil or gas well.

Other objects and advantages of the invention will be evident from the following detailed description and explanation.

Broadly speaking, the plugging method of the present invention comprises forcing into any porous strata in a well, which it is desired to seal, a fluid material comprising an organic polyisocyanate compound, containing at least two unreacted isocyanate groups per molecule, and reacting the isocyanate compound with a chain extender such as water or other polyfunctional compound containing two or more replaceable hydrogen atoms in situ, thereby forming a resinous polymer within the open passages of the porous formation and thus filling and plugging the same to prevent passage of unwanted fluids such as water, oils, gases, etc., therethrough. Where water is used as the polyfunctional compound to react with the polyisocyanate compositions, the water present in the formation may be employed, or water may be added before or after the introduction of the polyisocyanate compound, or water may be mixed with the polyisocyanate compound. Under controlled conditions, the rate of reaction of polyisocyanates with the chain extender may be varied to prevent setting up before it is introduced into the strata.

It is well known in the field of organic isocyanate chemistry that polyisocyanates (i. e., compounds containing two or more isocyanate groups per molecule) react readily with water or other polyfunctional compound containing two or more replaceable (active) hydrogen atoms to form a polymeric material which may vary from a very viscous liquid to a solid mass. We have found that this reaction of polyisocyanates can be used to great advantage in sealing porous subsurface formations. For example, let us assume that during the drilling of an oil or gas well the driller encounters a porous water bearing formation such that the seepage or inflow of water into the borehole interferes seriously with the drilling operation. In accordance with the present invention, the drilling operation is temporarily stopped at this point and the drill pipe and bit are removed from the well. The drilling fluid or mud is also pumped or blown out of the hole and any residual water in the hole is likewise blown out insofar as possible. The liquid polyisocyanate composition, in some cases containing water or other chain-extending compound admixed therewith, is then pumped into the well under pressure so as to force the same into the porous water bearing structure which is the source of the difficulty. As will readily be understood, the chain-extending material which may comprise the water added or already present in the underground formation then reacts with the isocyanate groups of the polyisocyanate compound to form in situ a very viscous or solid polymer which completely fills the pores of the structure and thereby effectively shuts off the flow of water.

Of course, there are other situations in which it may be desirable or necessary to seal off a porous underground formation where there is no water present in the formation. For example, where undesirable gas strata are encountered or a lost circulation condition may prevail wherein the liquid drilling fluid or mud escapes from the borehole and is lost into the porous formation. Under such conditions, the polyisocyanate composition is pumped into the well under pressure as before, but, in addition, a suitable quantity of water or other chain-extending agent is also pumped into the porous formation either admixed with, before, or following the injection of the polyisocyanate composition so that the desired polymer-forming reaction may take place within the pores of the formation. As an alternative procedure, dependent upon the porosity of the formation and the extent of the lost circulation problem, it may be desirable to pump water into the formation before the injection of the polyisocyanate composition. It is also possible to introduce water into the formation both before and after the introduction of the polyisocyanate composition. It is also possible to have the chain-extending material admixed with the polyisocyanate composition before it is pumped into the well.

Insofar as the drilling of oil wells is concerned, an important advantage of the present invention is the relative selectivity of the reaction of the polyisocyanate compound with water and not with oil or hydrocarbons. Thus, as heretofore briefly described, in a flowing oil well which is producing both oil and water, the oil production and efficiency of the well may be improved by pumping a polyisocyanate composition into the hole. The polyisocyanate compound which finds its way into the water-producing part of the formation will react with the water, thereby sealing off this portion of the formation. On the other hand, the polyisocyanate compound which is forced into the oil-producing portion of the formation will simply be flushed out with the oil flow. Of course, it will be understood by those skilled in the drilling art that by the judicious use of packers and other related techniques, it will be possible to inject the polyisocyanate composition into any desired localized area of the formation corresponding to a selected depth in the borehole. In other words, by packing off the borehole at one or more places, the injection of the polyisocyanate composition may be restricted entirely to the particular troublesome porous formation which it is desired to plug or seal off thereby simplifying the operation and at the same time avoiding the use of excessive amounts of the sealing composition.

There are many polyisocyanate compounds which may be utilized in accordance with the present invention including the relatively simple polyisocyanate compounds and also higher molecular weight polyisocyanate adducts or reaction products. The aromatic diisocyanates, i. e., in which each —NCO group is attached to an aromatic nucleus, are preferred because of the greater reactivity of these diisocyanates. Among the simple polyisocyanates which may be used effectively are: toluene-2,4-diisocyanate, 2,4,4'-diphenylether triisocyanate, m-phenylene diisocyanate, methylene bis - (4 - phenyl - isocyanate), cyclohexylene - 1,4 - diisocyanate, hexamethylene diisocyanate, toluene - 2,6 - diisocyanate, 4,4' - methylenediphenylisocyanate, 4,4' - methylenedi - ortho - tolylisocyanate, toluene - 2,4,6 - triisocyanate, 1 - methoxy - 2,4,6-benzenetriisocyanate, metaphenylenediisocyanate, 4-chloro - meta - phenylenediisocyanate, 4,4' - diphenyldiisocyanate, 1,5 - naphthalenediisocyanate, 1,4 - tetramethylenediisocyanate, 1,6 - hexamethylenediisocyanate, 1,10-decamethylenediisocyanate, 4,4' - methylene - bis(cyclohexylisocyanate), 1,5 - tetrahydronaphthalenediisocyanate, and 4 - methoxy - meta - phenylenediisocyanate.

For most purposes, we generally prefer to employ a higher molecular weight adduct or reaction product of a polyisocyanate with a polyfunctional compound containing active hydrogen. More specifically, the polyisocyanate compound may be reacted with a polyhydroxy compound, including the glycols and higher molecular weight polyetherglycols, or a polyester resin prepared by the esterification of dibasic acids with polyhydroxy compounds (generally referred to in the art as alkyd resins). Such adducts or reaction products of polyisocyanates may be referred to as "prepolymers." When the prepolymer comprises a polyisocyanate-polyester resin reaction product, the prepolymer is more particularly known as a polyurethane resin prepolymer. Upon reaction with water, the terminal isocyanate groups of the prepolymer are converted to urea groups which, in turn, link together the prepolymer units in a polyurethane-polyurea polymer. Of course, it will be understood that for purposes of the present invention, the prepolymer is prepared by reacting a molar excess of polyisocyanate compound with the polyhydroxy compound or polyester so that the final reaction product contains at least two unreacted isocyanate groups per molecule. In other words, the so-called prepolymer must still be a polyisocyanate compound so as to be capable of reaction with water in order to effect the desired result. From the viewpoint of availability and economy, the preferred polyhydroxy compound for reaction with a polyisocyanate to form a prepolymer is castor oil. However, other readily available polyhydroxy compounds may also be employed, such as polyalkylene ether glycols, polyester glycols, polyalkylene-arylene ether glycols, polyalkylene ether-thioether glycols, etc. In the case of polyisocyanate-glycol reaction products, the following glycols or polyether glycols may be mentioned as being particularly suitable: ethylene glycol, tetramethylene glycol, hexamethylene glycol, decamethylene glycol, polyethylene ether glycol, polypropylene ether glycol, polytetramethylene ether glycol, etc.

When the prepolymer consists of a polyisocyanate modified polyester resin, the polyesters may be prepared from polycarboxylic acids, particularly dibasic carboxylic acids, by reaction with a polyhydric alcohol including any of the aliphatic glycols. For example, such acids as adipic acid, sebacic acid, succinic acid, dilinoleic acid, maleic acid, and the like may be used, and among the aliphatic glycols which are suitable are ethylene glycol, propylene glycol, diethylene glycol, butanediol, glycerol, polyalkylene ether glycols, pentaerythritol, trimethylol propane, trimethylol ethane, etc.

In order to realize the full benefits of the invention, the polyisocyanate composition must have a sufficiently low viscosity that it can be pumped readily and can penetrate the porous structure undergoing treatment. Control of the viscosity of the composition is readily obtained by utilizing a suitable organic solvent, preferably an aromatic hydrocarbon solvent. Also, the penetrating ability of the polyisocyanate compound may be regulated to some extent by controlling the molecular weight of the polyisocyanate compound employed in the treating fluid. In the case of a formation having a small or fine pore structure, the impregnating composition may comprise one of the simple polyisocyanate compounds heretofore mentioned, e. g., methylene bis-(4-phenyl-isocyanate). On the other hand, for relatively coarse porous structures, one of the higher molecular weight polyisocyanate compounds may be used, such as a prepolymer or reaction product of a polyisocyanate with a polyhydroxy compound as heretofore mentioned. In either case, however, pumpability of the fluid and penetration of the underground formation may be improved by dissolving the polyisocyanate compound in a suitable solvent. In this way, the viscosity of the prepolymer becomes relatively less important. Thus, there is a wide field of selection of prepolymer compositions which may be utilized in the present invention, including the solid prepolymers. The use of a solvent for the polyisocyanate compound also has the further advantage that it facilitates release and escape of carbon dioxide gas produced during the reaction with water, thereby insuring a dense polymer or resin having the desired sealing effect in the pores of the formation.

In general, any of the readily available aromatic hydrocarbon solvents are preferred because of their relative inexpensiveness and their ability to mix with oil. For example, the lower molecular weight hydrocarbon solvents, such as toluene or xylene may be used to good advantage. In addition to the hydrocarbon solvents, any other solvent which does not react with the polyisocyanate compound may be used, e. g., ketone esters, tetrahydrofuran, dimethyl formamide, the halogenated aliphatic solvents, etc.

The term "active hydrogen atoms" refers to hydrogens which, because of their position in the molecule, display activity according to the Zerewitinoff test as described by Kohler in J. Am. Chem. Soc. 49, 3181 (1927). In the chain extenders useful in this invention, the active hydrogen atoms are attached to oxygen, nitrogen or sulfur. The groups containing the active hydrogen will ordinarily be —OH, —SH, —NH—, —NH$_2$, —COOH, —CONH$_2$, —CONHR where R represents an organic radical, —SO$_2$OH, —SO$_2$NH$_2$, or —CSNH$_2$. The chain extending compound may be aliphatic, aromatic, or cycloaliphatic or of mixed type. Typical of many organic compounds which are useful in this connection are ethylene glycol, hexamethylene glycol, diethylene glycol, adipic acid, terephthalic acid, adipamide, 1,2-ethanedithiol, hydroquinone, monoethanolamine, 4-aminobenzoic acid, m-phenylenediamine, propylenediamine, 4-aminobenzamide, sulfanilamide, aminopropionic acid, 1,4-cyclohexanedisulfonamide, 1,3-propanedisulfonamide, 4-hydroxybenzoic acid, p-aminophenol, ethylenediamine, succinic acid, succinamide, 1,4-butanedisulfonamide, 2,4-tolylenediamine, bis(4-aminophenyl) methane, β-hydroxypropionic acid and 1,2-ethanedisulfonic acid. Compounds containing at least one amino group are the preferred organic chain-extending agents.

In order to speed up the formation of the insoluble resinous polymer by the in situ action of the polyisocyanate compound with water, it is desirable to have present during the reaction a basic or alkaline catalyst. Thus, according to one procedure, alkaline water having a pH of about 8 or higher may be forced into the porous structure under pressure either before or after the polyisocyanate composition is injected. On the other hand, the polyisocyanate composition may itself include sufficient alkaline material to make the water alkaline when the polyisocyanate composition contacts the water in the formation. The preferred catalysts for the invention are the basic organic amines, particularly tertiary amines such as the trialkylamines including triethylamine, pyridine, N-methyl morpholine, dimethylpiperazine, etc. However, for large-scale use, it will generally be more economical to employ the more common or readily available alkaline catalysts, such as the alkaline metal and alkaline earth metal oxides, hydroxides, or carbonates. For example, sodium or potassium hydroxide or carbonate will ordinarily be the catalysts of choice for oil and gas well-drilling operations.

In order to illustrate and describe the inventions more fully, but not for purposes of limitation, the following data and specific examples are now presented.

*Example I*

An oil well is drilled by the air-drilling method. At a depth of about 1500 feet, a stratum of rock is reached through which water seeps to an extent that the cuttings ball up and will not blow out. The drill pipe and tools are pulled out and the residual water is blown or pumped out. Into the well is pumped about 30 barrels of a polyisocyanate composition previously prepared as follows: 2540 parts by weight of castor oil and 163 parts by weight of butane-1,3-diol were mixed together and then 1892 parts by weight of toluene-2,4-diisocyanate were added while agitating. The temperature rises to about 120° C. from the heat of reaction. The mass is then stirred an additional half hour at 90° C. The isocyanate-terminated polymer is cooled and dissolved in toluene in the ratio of 40 parts by weight of the polymer to 60 parts by weight of toluene. To the solution is added 0.5 part by weight of N-methylmorpholine to catalyze the reaction of the isocyanate polymer with water.

A pressure of 400 lbs. per square inch is put on the isocyanate composition to force it into the capillaries of the rock stratum. It is held under pressure for about two hours. The temperature in the rock stratum is about 150–200° F. The pressure is released and the liquid polyisocyanate composition remaining in the well is removed. The drill pipe and tools are then put back in the well and drilling is resumed. The drilling is no longer interrupted by water flow. A core sample from the stratum impregnated with the polyisocyanate composition which has reacted with the water therein is found to have its permeability reduced to about 0.5 millidarcys compared to an original value for the untreated rock of about 24 millidarcys.

*Example II*

For the purpose of evaluating the effectiveness of various isocyanate compositions, a test bomb is used having a perforated inner container spaced annularly from the bomb wall and adapted to receive a cylindrical core sample of the usual type. An axial cavity is provided at one end of the core sample, and a special fitting is mounted at the inlet of the core cavity for injecting a test fluid into the interior of the core sample under pressure. Of course, the bomb is fitted with a closure, and a sealing gasket is interposed between the closure and the upper end of the core sample in order to insure that all of the test fluid is forced into the interior of the core sample. Permeability of the core sample is measured by the well known plug type method both before and after injection of the isocyanate composition into the core sample. Thus, the reduction in permeability and porosity of the core sample is a direct measure of the effectiveness of a particular isocyanate composition for sealing off the pores of the particular formation from which the core sample is taken.

Using the foregoing procedure, a number of different core samples from various permeable rock formations are treated with a prepolymer composition prepared by the reaction of 3 molar quantities of toluene-2,4-diisocyanate with 1 molar quantity of castor oil. After injection with the isocyanate prepolymer composition, the samples are allowed to remain in a constant temperature oven for eight hours at 150° F. The results of the tests are as follows:

| Formation | Injection pressure (lbs./sq. in.) | Permeability (millidarcys) | | Porosity (percent) | |
|---|---|---|---|---|---|
| | | Before | After | Before | After |
| Grayburg | 600 | 1 | 0 | 7-10 | 0 |
| Glorietta | 300 | 3-5 | 0 | 10 | 0 |
| Clearfork | 300 | 3-4 | 0.2 | 12-15 | 2.2 |
| San Andres | 200 | 20 | 0.2 | 18 | 1.0 |
| Queen | 100 | 70 | 0.5 | 16 | 1.0 |

From the foregoing experimental data, it will readily be seen that the technique of the present invention is capable of rendering a porous underground formation totally or substantially impervious to the passage of fluid.

*Example III*

Using the same test procedure as in Example II on the same or similar core samples, extremely effective reduction of permeability and porosity are also obtained with the following isocyanate compositions:

(a) The reaction product of 1 molar quantity of castor oil, ¾ molar quantity of butanediol, and 4½ molar quantities of toluene-2,4-diisocyanate.

(b) The reaction product of 1 molar quantity of a polyetramethylene ether glycol (molecular weight of 1000) and 1.6 molar quantities of toluene-2,4-diisocyanate.

(c) The reaction product of 75 parts by weight of a commercially available polyester resin and 25 parts by weight of a mixture of 80 weight percent toluene-2,4-diisocyanate and 20 weight percent toluene-2,6-diisocyanate. The polyester resin used in the reaction is prepared from adipic acid, diethylene glycol, and trimethylol propane, and has an acid number of 60–65 and a molecular weight of 1900–2000.

In each case the isocyanate prepolymer is prepared simply by adding the isocyanate compound to the polyhydroxy or polyester ingredient, mixing well, and heating for a limited period of time after the initial heat of reaction has moderated. For example, in the case of the castor oil reaction products described above, the samples are heated for 30 minutes at 90° C. In the case of the glycol product the mixture is heated for 5 hours at 80° C. and for the polyester resin reaction product, the material is heated for 2 hours at 100° C.

*Example IV*

The water in a well hole is blown out as completely as possible by means of high pressure natural gas or air blown down the drill pipe extending down to the bottom of the hole. The drill pipe is taken out, the bit removed, and a drillable magnesium packer attached to the bottom section. When the packer (having a one-way valve) reaches a point approximately 25 feet above the porous formation, it is set firmly in place. At this point the packer is 76 feet above the bottom of the well hole. Water is pumped into the space between the casing and drill pipe. This water is added to make sure no materials return upwards once the placement is started.

A solution of 30 gallons of acetone and 5 gallons of water is prepared. 180 gallons of a polyisocyanate composition prepared by reacting (by weight) 50 parts of toluene-2,4-diisocyanate, 42.5 parts of castor oil and 7.5 parts of polyethylene glycol (molecular weight 200) are thoroughly mixed with 150 gallons of acetone. As this polyisocyanate composition in acetone is being pumped into the well, a sufficient quantity of the acetone/water mixture is added to give a total solution containing approximately 1% of water based on the polyisocyanate present.

Enough water (1350 gallons) is pumped into the well to force all of the material into the porous formation. This requires 1000 p. s. i. g. pressure as compared with the 700 p. s. i. g. pressure previously required to force water into the porous formation. The material is allowed to set up in the permeable zone for 30 hours.

After the waiting period, the packer is disengaged and the pipe withdrawn. A bit is attached and the drill pipe lowered to the packer. All the water in the casing above the packer is blown out. Then drilling of the drillable magnesium packer is started. Once the packer is drilled and the well hole entered, the water therein is blown out with no show of set-up isocyanate polymer and drilling is resumed. The sealing off of the porous layer is successful since drilling proceeds with "dusting" of the drill cuttings rather than "balling-up" which would occur if water were present.

We claim:

1. The method of sealing a porous underground formation adjacent to the borehole of a well which comprises introducing into the borehole a fluid composition containing as its active ingredient an organic polyisocyanate compound having at least two unreacted isocyanate groups per molecule, forcing said composition from the borehole into the pores of the formation under pressure, and holding the composition in the pores of the formation under pressure for a sufficient time to allow reaction of the polyisocyanate compound with a chain extender comprising a polyfunctional compound containing at least two active hydrogen atoms whereby to fill the pores with a polymeric reaction product and thereby sealing the pores against the passage of fluid.

2. The method of sealing a porous underground formation adjacent to the borehole of a well which comprises introducing into the borehole (1) a fluid composition containing as its active ingredient an organic polyisocyanate compound having at least two unreacted isocyanate groups per molecule and (2) a chain extender comprising a polyfunctional compound containing at least two active hydrogen atoms, forcing said composition and said chain extender from the borehole into the pores of the formation under pressure, and holding the same in the pores of the formation under pressure for a sufficient time to allow reaction of the polyisocyanate compound with the chain extender whereby to fill the pores with a polymeric reaction product and thereby sealing the pores against the passage of fluid.

3. The method of claim 2 further characterized in that said chain extender comprises water.

4. The method of sealing a porous water-containing underground formation adjacent to the borehole of a well which comprises introducing into the borehole a fluid composition containing as its active ingredient an organic polyisocyanate compound having at least two unreacted isocyanate groups per molecule, forcing said composition from the borehole into the pores of the formation under pressure, and holding the composition in the pores of the formation under pressure for a sufficient time to effect reaction in situ of the polyisocyanate compound with the water in the formation whereby to fill the pores with a polymeric reaction product and thereby sealing the pores against the passage of fluid.

5. The method of claim 1 further characterized in that said polyisocyanate compound comprises the reaction product of a polyisocyanate and a polyhydroxy compound.

6. The method of claim 1 further characterized in that said polyisocyanate compound comprises the reaction product of an aromatic diisocyanate and a polyester resin.

7. The method of claim 1 further characterized in that said polyisocyanate compound comprises the reaction product of toluene-2,4-diisocyanate with castor oil.

8. The method of claim 1 further characterized in that the reaction is carried out in the presence of a basic catalyst comprising a tertiary amine.

9. The method of claim 1 further characterized in that said polyisocyanate compound is introduced into the borehole as a solution thereof in a liquid organic solvent.

References Cited in the file of this patent

UNITED STATES PATENTS

| | | |
|---|---|---|
| 2,019,908 | Kennedy | Nov. 5, 1935 |
| 2,146,480 | Kennedy | Feb. 7, 1939 |
| 2,252,271 | Mathis | Aug. 12, 1941 |
| 2,366,036 | Leverett | Dec. 26, 1944 |
| 2,692,873 | Langerak et al. | Oct. 26, 1954 |
| 2,692,874 | Langerak et al. | Oct. 26, 1954 |